(12) United States Patent
Yang et al.

(10) Patent No.: US 12,180,604 B2
(45) Date of Patent: Dec. 31, 2024

(54) METHOD FOR COATING A SUBSTRATE

(71) Applicant: GIANT GLORY INTERNATIONAL LIMITED, Apia (WS)

(72) Inventors: Shun-Jie Yang, New Taipei (TW); Hsiang-Jui Wang, Taoyuan (TW); Cheng-Ping Hsiao, Changzhi Township, Pingtung County (TW)

(73) Assignee: GIANT GLORY INTERNATIONAL LIMITED, Apia (WS)

( * ) Notice: Subject to any disclaimer, the term of this patent is extended or adjusted under 35 U.S.C. 154(b) by 350 days.

(21) Appl. No.: 17/746,662

(22) Filed: May 17, 2022

(65) Prior Publication Data
US 2023/0160088 A1 May 25, 2023

(30) Foreign Application Priority Data
Nov. 19, 2021 (TW) .................................. 110143149

(51) Int. Cl.
*C25D 13/04* (2006.01)
*B05D 7/16* (2006.01)
(Continued)

(52) U.S. Cl.
CPC ............... *C25D 13/04* (2013.01); *B05D 7/16* (2013.01); *C09D 5/24* (2013.01); *C09D 5/4411* (2013.01);
(Continued)

(58) Field of Classification Search
CPC ........ C25D 13/04; C25D 13/20; C25D 13/22; C25D 17/06; C25D 11/026; C25D 11/20; C25D 7/00; C25D 11/005; C25D 17/005; C25D 11/30; C25D 11/246; C25D 11/26; C25D 13/14; C25D 13/12; C25D 13/06;
(Continued)

(56) References Cited

U.S. PATENT DOCUMENTS

2004/0238371 A1* 12/2004 Franz .................. C23C 18/1653
205/187
2012/0031765 A1* 2/2012 Curran ................. C25D 11/026
205/106
(Continued)

FOREIGN PATENT DOCUMENTS

CN 101831685 A 9/2010
CN 105473670 A 4/2016

OTHER PUBLICATIONS

Search Report appended to an Office Action, which was issued to Taiwanese counterpart application No. 110143149 by the TIPO on May 19, 2022, with an English translation thereof (2 pages).

*Primary Examiner* — Xiuyu Tai
(74) *Attorney, Agent, or Firm* — HSML P.C.

(57) ABSTRACT

A method for coating a substrate includes the steps of: forming a conductive coating layer on a surface of a substrate so as to form a semi-product; submerging a conductive sheet and the semi-product into an electrophoresis medium that includes charged colloid particles; and applying a voltage on the conductive sheet or the semi-product to form an electric field among the conductive sheet, the semi-product, and the electrophoresis medium, so that the colloid particles move along the electric field toward the semi-product and an electrophoretic covering layer formed by the charged colloid particles is thus deposited on the electrophoretic covering layer.

9 Claims, 3 Drawing Sheets

(51) Int. Cl.
  *C09D 5/24* (2006.01)
  *C09D 5/44* (2006.01)
  *C09D 7/41* (2018.01)
  *C09D 7/61* (2018.01)
  *C25D 13/20* (2006.01)
  *C25D 13/22* (2006.01)

(52) U.S. Cl.
  CPC ........... *C09D 5/4457* (2013.01); *C09D 5/448* (2013.01); *C09D 7/41* (2018.01); *C09D 7/61* (2018.01); *C25D 13/20* (2013.01); *C25D 13/22* (2013.01)

(58) Field of Classification Search
  CPC ... C09D 7/61; C09D 7/41; C09D 5/24; C09D 5/4411; C09D 5/4457; C09D 5/448; C09D 5/4473; C09D 5/44; C09D 201/00; B05D 7/16; C23C 8/04; C23C 8/80; C23C 8/40; C23C 14/34; C23C 28/345; C23C 8/36; C23C 28/32; C23C 14/081; C08J 7/042; C08J 7/043; C08J 2400/00; C08J 2423/28; C08J 2363/00; C08J 7/044; B60B 3/10; B60B 2900/141; B60B 2310/621; B60B 2310/656; B60B 2360/106; B60B 2310/618; B60B 2310/661; B60B 2310/654; B60B 2310/616; Y10T 428/24967; Y10T 428/21; Y10T 428/31511; H01B 1/20
  See application file for complete search history.

(56) References Cited

U.S. PATENT DOCUMENTS

2017/0058421 A1* 3/2017 Moravek ................ C25D 13/12
2020/0343526 A1* 10/2020 Oakes .................... C09D 127/12
2022/0403528 A1* 12/2022 Wu ........................ C25D 13/12

* cited by examiner

METHOD FOR COATING A SUBSTRATE

CROSS-REFERENCE TO RELATED APPLICATION

This application claims priority to Taiwanese Invention Patent Application No. 110143149, filed on Nov. 19, 2021.

FIELD

The disclosure relates to a coating method, and more particularly to an electrophoretic coating method.

BACKGROUND

Light metal materials such as magnesium or aluminum alloys are extensively used in the production of outer casings of portable electronic products due to their good mechanical strength and light weight. In order to satisfy consumer expectations in regards to product appearance, such as color, metallic sheen etc., surface treatment may be adopted so as to produce a variety of visual effects such as various different colors and/or adding metallic sheen.

Conventional surface treatments used in the industry includes electrophoretic deposition (EPD). In order to obtain a desired color, a dye or pigment is directly added to an electrophoretic solution, and an electrophoretic coating layer with a specific color (from the dye or pigment) is formed through electrophoresis on a surface of a metal substrate. This enables the surface of the metal substrate to have the desired color and retain a glossy sheen. However, the electrophoretic process needs to be performed at low voltage (not more than 60V) to avoid electrolysis of the metal substrate. In addition, in order to achieve the required level of gloss or sheen on the metal substrate, the electrophoretic coating layer needs to have a sufficient thickness (generally, to achieve a gloss level of 85 GU, the thickness needs to be in the range of about 20 μm to 25 μm). However, since the method is performed at low voltage, a longer processing time is needed to achieve the required thickness. Additionally, the dyes and/or pigments may change the surface tension of the electrophoretic solution. The long processing time and the changed surface tension may increase the risk of the electrophoretic coating layer developing an orange peel coating defect, and cause merchandise manufactured from the metal substrate to be less aesthetically pleasing to consumers.

Another conventional method to obtain the desired color is to anodize the metal substrate in advance to form a porous oxide passivation film on its surface in order to avoid corrosion by moisture or chemical agents, and then dye the porous oxide passivation film through dip coating. Subsequently, a transparent electrophoretic coating layer is formed on the metal substrate through an electrophoretic process to increase surface gloss levels. However, since the porous oxide passivation film increases the electrical resistance of the surface of the metal substrate and makes the metal substrate more electrically insulating, a higher voltage (180V or more) is required to be applied when conducting the electrophoretic process. Yet, applying too much voltage will also contribute to increasing the likelihood of the orange peel coating defect developing on the surface of the metal substrate, which causes the finished merchandise to have a less aesthetically pleasing appearance. In addition, the thickness of the electrophoretic coating layer must be greater than around 50 μm to achieve the required gloss levels. Consequently, the production cost of this method is also relatively high.

Therefore, the efforts of the industry has been directed towards adjusting the surface treating method in order to solve the aforesaid problems.

SUMMARY

Therefore, an object of the disclosure is to provide a method for coating a substrate that can alleviate at least one of the drawbacks of the prior art.

According to the disclosure, the method for coating a substrate includes the steps of:

forming a conductive coating layer on at least a part of a surface of a substrate so as to form a semi-product, the conductive coating layer being made of a conductive lacquer and has a surface resistance no greater then 500 Ω·m;

submerging a conductive sheet and the semi-product into an electrophoresis medium that includes charged colloid particles, the conductive sheet and the semi-product functions as electrodes; and applying a voltage ranging between 60V and 120V on one of the conductive sheet and the semi-product so as to form an electric field among the conductive sheet, the semi-product and the electrophoresis medium, so that a part of the colloid particles move along a direction of the electric field toward the semi-product and an electrophoretic covering layer formed by the charged colloid particles is thus deposited on the conductive coating layer, the electrophoretic covering layer has a thickness of no greater than 30 μm.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
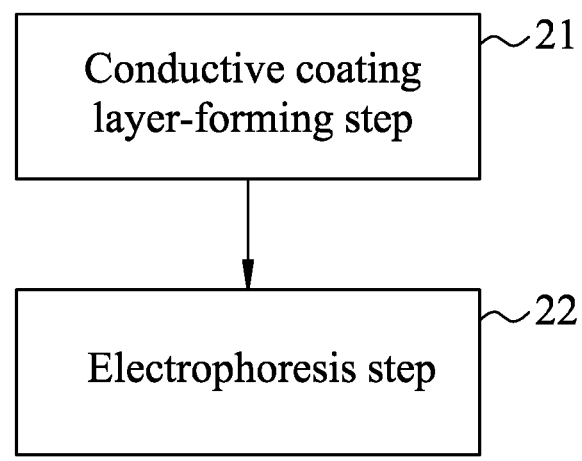
FIG. 1 is a flow chart showing an embodiment of a method for coating a substrate according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
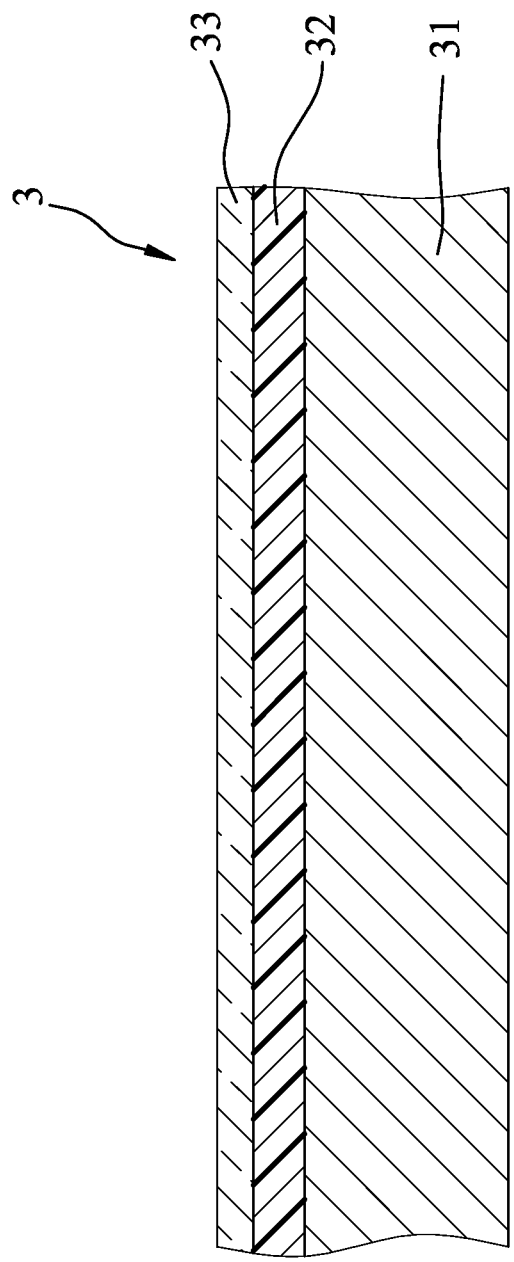
FIG. 2 is a schematic sectional view illustrating a metal components obtained by the method according to the present disclosure.

Referring to FIGS. 1 and 2, the present disclosure relates to a method for coating a substrate, more specifically, a high gloss electrophoretic coating method for forming a processed metal component 3 as shown in FIG. 2. The method according to the present disclosure includes a conductive coating layer-forming step (step 21) and an electrophoresis step (step 22).

Step 21 involves forming a conductive coating layer 32 on at least a part of a surface of a substrate 31 so as to form a semi-product 30.

The substrate 31 may be made of a light metal material which is light weight and easy to process, such as magnesium, aluminum, magnesium alloy, aluminum alloy, magnesium-aluminum alloy, etc. The conductive coating layer 32 is formed on the surface of the substrate 31 by coating, and has a thickness ranging between 10 µm and 20 µm and a surface resistance of no greater than 500 Ω·m. The conductive coating layer 32 can provide high electric conductivity and prevent the substrate 31 from being corroded through contact with moisture or chemical agents during subsequent steps of the coating method.

In certain embodiments, the conductive coating layer 32 is made of a conductive lacquer, which includes a base material, a conductive material, and a colorant. The base material is epoxy resin or acrylic resin, and can be used as a dispersing agent to evenly distribute the conductive material and the colorant in the conductive lacquer so that the color of the conductive coating layer 32 is more uniform. At the same time, the base material increases adhesion between the conductive coating layer 32 and the substrate 31, so that the conductive coating 32 can be closely adhered to the surface of the substrate 31. The conductive material may be modified titanium oxide, metal, nano carbon material (e.g., carbon-nanotube), graphite, graphene, or other materials that have low electrical resistance, which gives the conductive coating layer 32 high electrical conductivity. The modified titanium oxide is obtained by coating a conductive material on titanium oxide particles so as to obtained titanium oxide with increased conductivity. The colorant may be inorganic pigments or organic dyes, so that the conductive coating layer 32 can be formed in a desired color.

The conductive coating layer 32 can be formed on the surface of the substrate 31 through spray coating, roller coating or dip coating, etc. In this embodiment, the conductive coating layer 32 is formed by spray coating the conductive lacquer onto the surface of the substrate 31 (see FIG. 2) and curing the conductive lacquer to form the conductive coating layer 32 with a thickness of 20 µm and a surface resistance of 200 Ω·m to 400 Ω·m. In this embodiment, the conductive lacquer is thoroughly mixed with an organic solvent (e.g., isobutanol, toluene, etc.) to obtain a mixture with a suitable viscosity, and then the mixture is sprayed on the surface of the substrate 31 and is dried so as to form the conductive coating layer 32. The weight ratio of the conductive lacquer (including the base material, the conductive material, and the colorant) to the solvent is between 3:7 and 4:6. However, in practice, the ratio of the conductive lacquer to the organic solvent can be adjusted according to processing requirements and are not limited to the ratios disclosed herein.

In some embodiments, the conductive coating layer 32 may completely cover the entire surface of the substrate 31, or may be formed on a part of the surface of the substrate 31 as required. As long as the subsequent electrophoresis step 22 can be performed thereon. It should be noted that the size and location of the conductive coating layer 32 is not limited to the disclosed embodiments.

In some embodiments, when the conductive material in the conductive lacquer has bright color, the conductive lacquer may only include the base material and the conductive material, and will not require the colorant. For example, when the conductive material is the modified titanium oxide with white color, the conductive coating layer 32 may be white. On the other hand, if the conductive material is nano carbon material, graphite, or graphene which has black color, the conductive coating layer 32 may be black in color.

Figure 3:
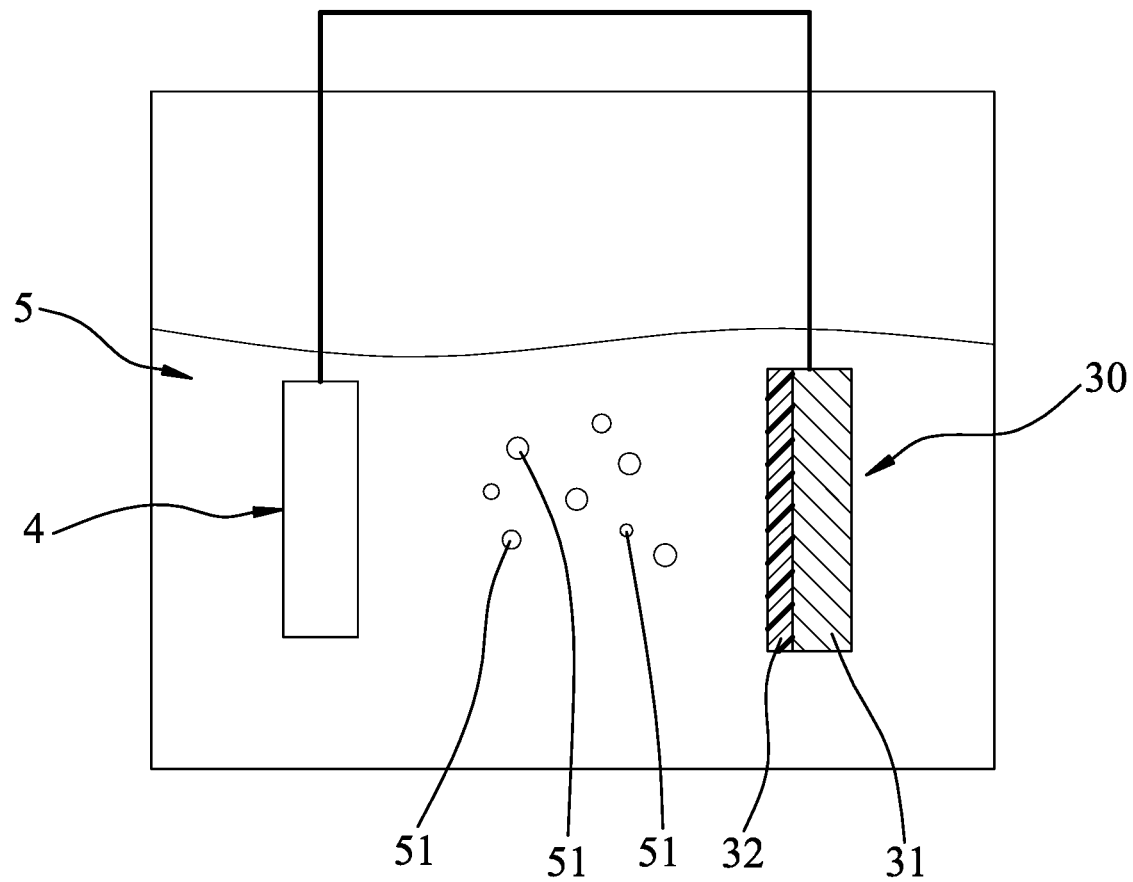
FIG. 3 is a schematic view illustrating an electrophoresis step of the method according to the present disclosure.

Referring to FIG. 3, the electrophoresis step (step 22) of the coating method according to the present disclosure involves the following procedures. First, a conductive sheet 4 and the semi-product 30 are submerged into an electrophoresis medium 5 that includes charged colloid particles 51, where the conductive sheet 4 and the semi-product 30 function as electrodes. Subsequently, a voltage ranging between 60V and 120V is applied on one of the conductive sheet 4 and the semi-product 30, so as to form an electrical field among the conductive sheet 4, the semi-product 30 and the electrophoresis medium 5 (i.e., forming an electrically conductive loop among the conductive sheet 4, the semi-product 30 and the electrophoresis medium 5), so that a part of the colloid particles 51 move along a direction of the electrical field toward the semi-product 30 and an electrophoretic covering layer 33 formed by the charged colloid particles 51 is thus deposited on the conductive coating layer 32. The electrophoretic covering layer 33 has a thickness no greater than 30 µm.

In some embodiments according to the present disclosure, the voltage applied in step 22 ranges from 60V to 100V.

In some embodiments, the voltage applied in step 22 ranges from 80V to 100V.

It should be noted that, the colloid particles 51 are a waterborne resin and purified water is used as a solvent in the electrophoresis medium 5. In the method according to the present disclosure, the semi-product 30 may be used as either an anode or a cathode depending on the electric charge type of the colloid particles 51 in the electrophoresis medium 5. When the voltage is applied and the electrical field is formed, the charged colloid particles 51 are moving along the direction of the electric field toward the semi-product 30 and is deposited on the conductive coating layer 32, so as to form the electrophoretic covering layer 33.

In order to avoid the orange peel defect caused by excessively high voltage during step 22, and overly long processing time due to the application of overly low voltage, the voltage applied in step 22 may range from 80V to 120V, and the electrophoretic covering layer 33 is formed to be no thicker than the conductive coating layer 32.

A total thickness of the conductive coating layer 32 and the electrophoretic covering layer 33 may be no greater than e.g., 50 µm. In some embodiments, the electrophoretic covering layer 33 is no thicker than 30 µm. In certain embodiments, the thickness of the electrophoretic covering layer 33 ranges from 20 µm to 25 µm. In this embodiment, the voltage applied in step 22 is 80V, and the thickness of the electrophoretic covering layer 33 is 25 µm.

In this embodiment, the colloid particles 51 are an acrylic acid resin, and purified water is used as a solvent in the electrophoresis medium 5. The conductive sheet 4 and the semi-product 30 are respectively serving as the anode and the cathode, and a positive voltage of 80V is applied to the conductive sheet 4 so that the colloid particles 51 move toward the semi-product 30, to form a transparent electrophoretic covering layer 33 on the conductive coating layer 32 and to obtain the processed metal component 3 with a surface gloss level of no less than 100 GU (gloss units), measured at a specified angle of 60 degrees.

In the method according to the present disclosure, by first forming on the surface of the substrate 31 the conductive coating layer 32 with good electrical conductivity (low surface resistance of no greater than 500 Ω·m), a voltage that ranges from 60V-120V, e.g., 100V to 120V is used to create the electrical field (among the conductive sheet 4, the semi-product 30 and the electrophoresis medium 5). At this voltage, the colloid particles 51 are moved by the electrical field and uniformly adhered on the conductive coating layer 32 to form the electrophoretic covering layer 33, so that the orange peel defect can be avoided. Additionally, since the electrophoresis medium 5 does not include pigment or dye, the electrophoretic covering layer 33 may remain relatively thin (no thicker than 30 µm) so that it has good transparency. This provides a further advantage in that the surface tension of the electrophoresis medium can remain stable by not adding pigment and dye, and the stable surface tension can also aid to prevent the development of the orange peel defect. On another note, the conductive coating layer 32 can shield the substrate 31 from contact with moisture or chemical agents (e.g., those in the electrophoresis medium 5), thereby alleviating corrosion problem of the substrate 31. Moreover, the conductive coating layer 32 also alleviate the electrolysis issue of the substrate 31. Since the method of the present disclosure allows a higher voltage to be applied, the time for forming the electrophoretic covering layer 33 may be shortened. Additionally, since the color of the processed metal component 3 is solely provided by the conductive coating layer 32, while the transparent electrophoretic covering layer 33 is to provide protection and increase gloss levels, the electrophoretic covering layer 33 can be made thinner while retaining high gloss levels and having good visual appearance.

In summary, the coating method according to the present disclosure initially forms the conductive coating layer 32 on the surface of the substrate 31 to reduce the surface resistivity thereof, so that the electrophoretic process in the later steps can be performed under a lower applied voltage which ranges from 60V to 120V (e.g., from 100V to 120V). The processed metal component 3 made according to the method of the present disclosure has high gloss with lower likelihood of developing surface defects such as the orange peel defect. Therefore, the visual appear of the processed metal component 3 is enhanced. Additionally, compared with the conventional method of dyeing through dip coating to obtain the desired color effect on the processed metal component 3, in this disclosure, the color of the processed metal component 3 is proved by the conductive coating layer 32. The conductive coating layer 32 further provides protection to shield the substrate from electrolysis, and allows the electrophoresis to be conducted under higher applied voltage which shortens the processing time.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for coating a substrate, comprising the steps of:
    forming a conductive coating layer on at least a part of a surface of the substrate so as to form a semi-product, the conductive coating layer being made of a conductive lacquer and having a surface resistance no greater than 500 Ω·m;
    submerging a conductive sheet and the semi-product into an electrophoresis medium that includes charged colloid particles, the conductive sheet and the semi-product functioning as electrodes; and
    applying a voltage ranging between 60V and 120V on one of the conductive sheet and the semi-product to form an electrical field among the conductive sheet, the semi-product and the electrophoresis medium, so that a part of the charged colloid particles move along a direction of the electric field toward the semi-product and an electrophoretic covering layer formed by the charged colloid particles is thus deposited on the conductive coating layer, the electrophoretic covering layer having a thickness no greater than 30 µm.

2. The method according to claim 1, wherein a total thickness of the conductive coating layer and the electrophoretic covering layer is no greater than 50 µm.

3. The method according to claim 1, wherein
    the conductive lacquer includes a base material and a conductive material,
    the base material is one of an epoxy resin and an acrylic resin, and
    the conductive material is one of modified titanium oxide, metal, carbon-nanotube, graphite, and graphene.

4. The method according to claim 3, wherein the conductive lacquer further includes a colorant that is one of an inorganic pigment and an organic dye.

5. The method according to claim 1, wherein the substrate is made of a material which is one of magnesium, aluminum, magnesium alloy, aluminum alloy, and magnesium-aluminum alloy.

6. The method according to claim 1, wherein the charged colloid particles of the electrophoresis medium is a waterborne resin.

7. The method according to claim 1, wherein the voltage ranges from 80 v to 120 v.

8. The method according to claim 7, wherein the voltage ranges from 80 v to 100 v.

9. The method according to claim 1, wherein the step of forming the conductive coating layer on at least the part of the surface of the substrate is conducted by coating technique.

\* \* \* \* \*